July 31, 1928.
G. L. TULLY ET AL
1,679,105
GOGGLES
Filed May 16, 1927
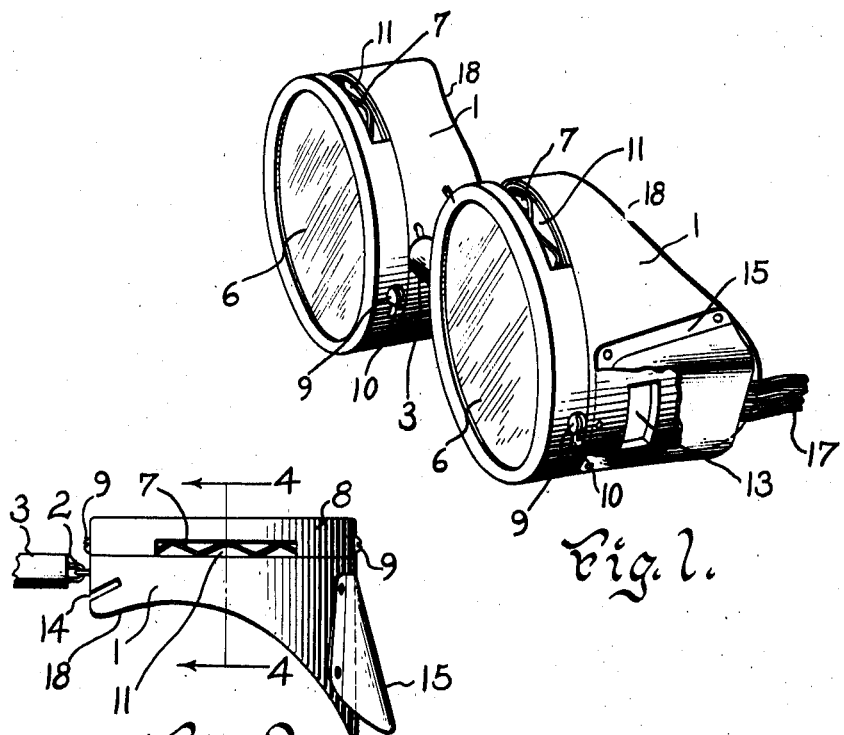
Fig. 1.
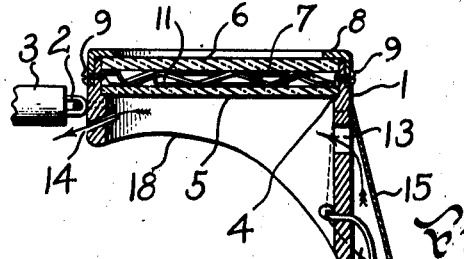
Fig. 2.
Fig. 3.
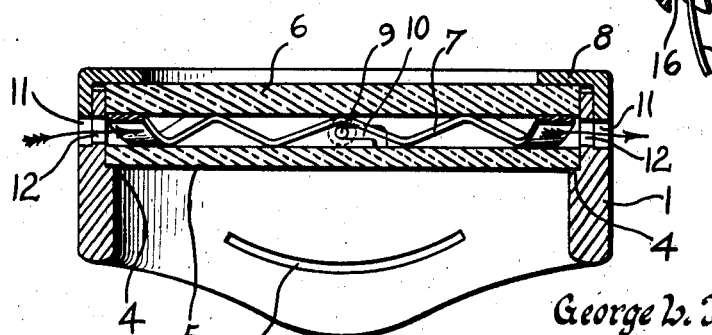
Fig. 4.
Inventor
George L. Tully.
Solomon Lacasse.
By Harry H. Styll
Attorney Patented July 31, 1928.

1,679,105

UNITED STATES PATENT OFFICE.

GEORGE L. TULLY AND SOLOMON LACASSE, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

GOGGLES.

Application filed May 16, 1927. Serial No. 191,732.

This invention relates to improvements in ophthalmic mountings and more particularly to an improved eye cup for a goggle or the like.

The principal object of the invention is to provide an improved eye cup having two lenses spaced from each other with ventilation between the two lenses and an additional ventilation in the eye cup between the inner lens and the eye.

Another object of the invention is to provide improved means for holding a pair of spaced lenses in a goggle eye cup.

Another object of the invention is to provide improved means by which a pair of spaced lenses may be inserted in or removed from the eye cup.

Another object of the invention is to provide means of ventilation by which the air is received at one point and exhausted at another point, both between the pair of spaced lenses in the eye cup and in the space between the inner lens and the eye.

Another object of the invention is to provide improved means of air baffling in the ventilating means for a goggle eye cup.

Other objects and advantages of the invention will become apparent from the following description taken in connection with the accompanying drawings, and it will be apparent that many modifications may be made in the details of construction and arrangement of parts without departing from the spirit of the invention as expressed in the accompanying claims. We, therefore, do not wish to be limited to the exact details and arrangements shown, the preferred forms only having been shown by way of illustration.

Referring to the drawings:

Fig. 1 is a perspective view of a goggle embodying the invention.

Fig. 2 is a side elevation of one of the eye cups embodying the invention.

Fig. 3 is a cross section through one of the eye cups.

Fig. 4 is a cross section on line 4—4 of Fig. 2.

This invention relates particularly to a goggle for use in the industrial field, such as by welders and those employed in handling molten metal, glass and similar products, and embraces the use of two lenses, the inner lens being preferably of colored glass to reduce the glare from the molten material and the outer lens being of plain glass. Colored glass is expensive, whereas the outer plain glass is cheap and economical. If the outer glass is broken it can be easily replaced, or if it becomes scratched or marred so as to become semi-opaque a new lens can be quickly and easily inserted for the old one. A great many of these goggles are used by acetylene welders and workmen employed in use before an oxweld acetylene flame.

The goggle comprises a pair of eye cups 1 which are preferably made of a composition material, such as bakelite, or hard rubber, which is impervious to heat. The eye cups 1 are connected by a chain bridge 2 which is surrounded by a rubber covering 3. The eye cup 1 is annular in shape and has a shouldered flange 4 to support the inner colored lens 5. A second lens 6 which is preferably a clear glass lens is supported in the annular eye cup 1 adjacent its outer end and beyond the lens 5. This lens 6 is held in spaced relation from the lens 5 by a crimped spring member 7 which insures a resilient seating for the lens 6 allowing the lens 6 to slightly yield if it is struck by a blow. The lens 6 is retained in place on the spring 7 by means of the annular cap 8 which fits over the terminal flange of the eye cup 1 being held in place thereon by the stud screws 9 which enter a bayonet slot 10 in the lower edge of the cap 8. There are preferably two of the studs 9 and bayonet slots 10.

The space between the lenses 5 and 6 is ventilated by means of two slots 11 diametrically located in the cap 8 by means of the slots 12 in the eye cup 1, which slots 12 align with the slots 11 in the cap 8. It will be seen that the air may enter on one side through the slots 11 and 12 and be exhausted on the other side through the similar and opposite slots 11 and 12, thus giving a clear flow of air between the lenses 5 and 6 to prevent steaming, fogging, etc.

The space in the eye cup 1 between the lens 5 and the eye is ventilated by two diametrically arranged slots 13 and 14 in the eye cup 1. Over the opening 13 is placed the shield 15 which is closed on three sides but open on the bottom side 16 to allow the air to enter and go through the opening 13. The air may be exhausted through the opening 14 on the inside of the cup. The shield 15 may be of metal or other material and may be riveted to the eye cup 1 or otherwise secured thereto. The eye cups of the finished goggle are held in place over the eyes by means of a head band 17 which is preferably made of an elastic material having an attachable adjustable buckle to adjust it to the proper size.

The inner or eye side of the cup 1 is cut on an angle and shaped to fit the face as indicated by the line 18. The lenses may be removed by loosening the screws 9 sliding back the cap 8 on the bayonet slots 10 and withdrawing the cup and then pushing the lenses out from the inside of the cup. They may be inserted in the reverse order.

From the foregoing description of the construction and operation it will be seen that the invention provides means for holding a pair of spaced lenses with resilient means between them and with ventilating means between them in an eye cup which itself has ventilating means between the inner lens and the eye, and that provision has been made both for the ingress and outgress of the air on opposite sides of the eye cup both between the lenses and in the eye cup itself, and means have been provided for baffling air in the larger ventilating opening into the main eye cup. This arrangement will permit of the use of colored or tinted lenses having absorption properties both of the rays of light and the glare. The arrangements provide a simple, efficient and economical means for carrying out all of the objects of the invention.

Having described our invention, we claim:

1. In a device of the character described, an eye cup, a pair of lenses spaced one from the other adjacent one end of the cup, and ventilation openings through the cup between the lenses.

2. In a device of the character described, an eye cup, a pair of lenses spaced one from the other adjacent one end of the cup, ventilating openings through the cup between the lenses, and additional ventilation openings through the cup interiorly of the lenses.

3. In a device of the character described, an eye cup, a pair of lenses adjacent one end of the eye cup, a resilient member separating the lenses, and ventilation openings through the cup between the separated lenses.

4. In a device of the character described, an eye cup, a pair of lenses adjacent one end of the eye cup, a resilient member separating the lenses, ventilation openings through the cup between the separated lenses, and ventilation openings through the cup interiorly of the lenses.

5. In a device of the character described, an eye cup, a lens adjacent one end thereof, a cap over the end of the eye cup, a lens in the cap spaced from the lens in the cup, and spaced ventilation openings through the cap into the space between the lenses.

6. In a device of the character described, an eye cup, a lens adjacent one end thereof, a cap over the end of the eye cup, a lens in the cap, a resilient member between and separating the lenses and spaced ventilation openings through the cap into the space between the lenses.

GEORGE L. TULLY.
SOLOMON LACASSE.